(12) United States Patent
Beck

(10) Patent No.: US 10,678,061 B2
(45) Date of Patent: Jun. 9, 2020

(54) LOW ETENDUE ILLUMINATION

(71) Applicant: Laser Light Engines, Inc., Salem, NH (US)

(72) Inventor: William Brady Beck, Derry, NH (US)

(73) Assignee: Laser Light Engines, Inc., Salem, NH (US)

( * ) Notice: Subject to any disclaimer, the term of this patent is extended or adjusted under 35 U.S.C. 154(b) by 313 days.

(21) Appl. No.: 14/193,876

(22) Filed: Feb. 28, 2014

(65) Prior Publication Data

US 2014/0177049 A1   Jun. 26, 2014

Related U.S. Application Data

(62) Division of application No. 12/553,890, filed on Sep. 3, 2009, now abandoned.

(51) Int. Cl.
| | |
|---|---|
| G02B 27/26 | (2006.01) |
| G02B 27/22 | (2018.01) |
| G02F 1/37 | (2006.01) |
| G02F 1/39 | (2006.01) |
| G02B 27/10 | (2006.01) |
| G02B 27/14 | (2006.01) |
| G02B 27/28 | (2006.01) |
| G02B 27/48 | (2006.01) |
| H01S 3/23 | (2006.01) |
| H04N 9/31 | (2006.01) |
| H04N 13/337 | (2018.01) |
| H04N 13/341 | (2018.01) |
| H04N 13/324 | (2018.01) |
| H04N 13/334 | (2018.01) |
| H04N 13/363 | (2018.01) |
| H04N 13/327 | (2018.01) |
| H01S 3/0941 | (2006.01) |

(Continued)

(52) U.S. Cl.
CPC .............. *G02B 27/26* (2013.01); *G02B 27/22* (2013.01); *G02B 27/2264* (2013.01); *G02F 1/37* (2013.01); *G02F 1/39* (2013.01)

(58) Field of Classification Search
CPC ........... H04N 13/0409; H04N 13/0431; H04N 13/0434; H04N 13/0436
USPC ................................................. 359/462–477
See application file for complete search history.

(56) References Cited

U.S. PATENT DOCUMENTS

| | | |
|---|---|---|
| 4,019,159 A | 4/1977 | Hon |
| 4,035,068 A | 7/1977 | Rawson |

(Continued)

FOREIGN PATENT DOCUMENTS

JP   2003121664 A   4/2003

OTHER PUBLICATIONS

Weibin Chen, Design of Non-Polarizing Color Splitting Filters used for Projection Display System, Displays, Mar. 2005, pp. 65-70, vol. 26, Elsevier, USA.

(Continued)

*Primary Examiner* — Kimberly N. Kakalec

(74) *Attorney, Agent, or Firm* — Michael Best & Friedrich LLP

(57) ABSTRACT

An optical system and method that utilize multiple low-etendue lasers to illuminate multiple spots one or more spatial light modulators. Stereoscopic systems may be formed by using different wavelengths or different polarizations for each spot. Light from each spot is guided to each eye of the viewer by wearing 3D glasses.

22 Claims, 10 Drawing Sheets

(51) Int. Cl.
  *H01S 3/16* (2006.01)
  *H01S 3/00* (2006.01)
  *H01S 3/06* (2006.01)

(56) References Cited

U.S. PATENT DOCUMENTS

| | | | |
|---|---|---|---|
| 4,870,486 A | 9/1989 | Nakagawa | |
| 4,978,202 A | 12/1990 | Yang | |
| 5,537,144 A * | 7/1996 | Faris | G02B 27/0093 348/54 |
| 5,694,164 A | 12/1997 | Choi | |
| 5,703,691 A | 12/1997 | Klaras | |
| 5,740,190 A | 4/1998 | Moulton | |
| 5,774,489 A | 6/1998 | Moulton | |
| 5,851,740 A | 12/1998 | Sawyer | |
| 5,993,004 A * | 11/1999 | Moseley | G02B 27/26 348/E13.03 |
| 6,011,809 A | 1/2000 | Tosaka | |
| 6,047,011 A | 4/2000 | Cook | |
| 6,049,558 A | 4/2000 | Harada et al. | |
| 6,128,133 A | 10/2000 | Bergmann | |
| 6,233,025 B1 | 5/2001 | Wallenstein | |
| 6,233,089 B1 | 5/2001 | Nebel | |
| 6,249,371 B1 | 6/2001 | Masuda et al. | |
| 6,283,597 B1 | 9/2001 | Jorke | |
| 6,317,169 B1 | 11/2001 | Smith | |
| 6,373,866 B1 | 4/2002 | Black | |
| 6,488,379 B2 | 12/2002 | Kane | |
| 6,525,847 B2 | 2/2003 | Popovich | |
| 6,577,429 B1 | 6/2003 | Kurtz | |
| 6,590,658 B2 | 7/2003 | Case | |
| 6,594,090 B2 | 7/2003 | Kruschwitz | |
| 6,671,305 B2 | 12/2003 | Knights | |
| 7,102,700 B1 | 9/2006 | Pease | |
| 7,142,257 B2 | 11/2006 | Callison | |
| 7,182,468 B1 | 2/2007 | Haven | |
| 7,190,518 B1 * | 3/2007 | Kleinberger | G02B 27/0093 348/57 |
| 7,193,765 B2 | 3/2007 | Christensen | |
| 7,296,897 B2 | 11/2007 | Mooradian | |
| 7,357,513 B2 | 4/2008 | Watson | |
| 7,369,334 B2 | 5/2008 | Case | |
| 7,374,290 B2 | 5/2008 | Sato | |
| 7,379,251 B2 | 5/2008 | Miwa | |
| 7,445,339 B2 | 11/2008 | Dvorkis | |
| 7,446,931 B2 | 11/2008 | Miller | |
| 7,486,435 B2 | 2/2009 | Slater | |
| 7,502,160 B2 | 3/2009 | Aksyuk | |
| 7,518,784 B2 | 4/2009 | Saffman et al. | |
| 7,720,126 B2 | 5/2010 | McCarthy | |
| 7,876,802 B2 | 1/2011 | McDonagh | |
| 7,891,816 B2 | 2/2011 | Silverstein et al. | |
| 8,408,708 B2 | 4/2013 | Sharp | |
| 8,416,830 B2 | 4/2013 | Ovtchinnikov et al. | |
| 8,477,410 B2 | 7/2013 | Hodgson et al. | |
| 8,599,476 B1 | 12/2013 | Kozlov et al. | |
| 2002/0159496 A1 | 10/2002 | Peressini | |
| 2003/0112507 A1 | 6/2003 | Divelbiss et al. | |
| 2003/0210371 A1 | 11/2003 | Chaudhari | |
| 2004/0008392 A1 | 1/2004 | Kappel | |
| 2004/0090601 A1 | 5/2004 | Nakanishi | |
| 2005/0237487 A1 | 10/2005 | Chang | |
| 2006/0290889 A1 | 12/2006 | Robinson | |
| 2006/0291053 A1 | 12/2006 | Robinson | |
| 2007/0139624 A1 | 6/2007 | DeCusatis | |
| 2007/0188443 A1 * | 8/2007 | Mehrl | G02B 26/0841 345/108 |
| 2007/0195276 A1 | 8/2007 | Plut | |
| 2007/0273798 A1 * | 11/2007 | Silverstein | G02B 13/22 348/752 |
| 2008/0049232 A1 | 2/2008 | Vakoc | |
| 2008/0055401 A1 | 3/2008 | DeCusatis | |
| 2008/0117491 A1 | 5/2008 | Robinson | |
| 2008/0144183 A1 | 6/2008 | Zhang | |
| 2008/0158672 A1 * | 7/2008 | McCosky | H04N 13/0431 359/464 |
| 2008/0240176 A1 | 10/2008 | Masuda | |
| 2009/0056098 A1 | 3/2009 | Payne | |
| 2009/0168025 A1 | 7/2009 | Domm | |
| 2009/0219385 A1 * | 9/2009 | Leister | G02B 27/2214 348/51 |
| 2009/0231697 A1 | 9/2009 | Marcus et al. | |
| 2010/0026959 A1 | 2/2010 | Yoon et al. | |
| 2010/0110166 A1 | 5/2010 | Chang | |
| 2011/0205496 A1 | 8/2011 | Schuck et al. | |
| 2013/0016321 A1 | 1/2013 | Duelli et al. | |
| 2013/0169936 A1 | 7/2013 | Kurashige et al. | |
| 2014/0085609 A1 | 3/2014 | Vermeirsch et al. | |

OTHER PUBLICATIONS

Sergei Yakovenko, Lifetime of Single Panel LCOS Imagers, SID 04 Digest, 2004, pp. 64-67, Society for Information Display, USA.
Chien-Hui Wen, Photostability of Liquid Crystals and Alignment Layers, Journal of the SID, 2005, pp. 805-811, 13/9, Society for Information Display, USA.

* cited by examiner

LOW ETENDUE ILLUMINATION

BACKGROUND OF THE INVENTION

Effective light sources for projectors may be constructed from lamps with high brightness such as high intensity discharge (HID) lamps, light emitting diodes (LEDs), or lasers. A light source with low etendue can be efficiently coupled through a projector when the etendue of the light source is less than or equal to the etendue of the following optical system in the projector.

Most stereoscopic projection systems can be characterized as one of two basic types: (1) time-sequential projection that uses one spatial light modulator (SLM) per color and alternately shows left eye images and right eye images in rapid sequence, and (2) simultaneous projection that uses two SLMs per color, one for the left eye images and one for the right eye images. In a third type, split image projection, there is only one SLM per color, and the left and right eye images are formed simultaneously on separate parts or pixels of the single SLM.

Stereoscopic left and right images may be formed by using spectral selection, for example as described in U.S. Pat. No. 6,283,597, the complete disclosure of which is incorporated herein by reference. In the spectral selection method, first wavelength bands of red, green, and blue are passed to the left eye, and second wavelength bands of red, green, and blue are passed to the right eye. The first bands and second bands are distinct so that there is little or no overlap between the first and second bands.

The optical designs of most digital image projectors use SLMs to switch each pixel on and off in order to create a visual image. The SLMs may be reflective, such as liquid crystal on silicon (LCOS) devices and digital micromirror devices (DMDs), or may be transmissive such as liquid crystal display (LCD) devices.

SUMMARY OF THE INVENTION

In general, in one aspect, an optical system that includes two light sources and a spatial light modulator. The first light source has a first optical output that is processed by the first part of the spatial light modulator and the second light source has a second optical output that is processed by the second part of the spatial light modulator.

Implementations may include one or more of the following features. The first light source may have an etendue lower than 0.1 $mm^2$ sr and may include a laser. The first part of the spatial light modulator may be used to form an image for the left eye, and the second part of the spatial light modulator may be used to form an image for the right eye. There may be a beam combiner which forms a combined image by combining the image for the left eye with the image for the right eye. There may be an anamorphic lens which expands or compresses the image for the left eye of the viewer such that a single axis is expanded or compressed relative to an orthogonal axis. The combined image may have a checkerboard pattern of pixels, wherein the checkerboard pattern alternates pixels for the left eye and pixels for the right eye. All of the pixels of the spatial light modulator may be utilized by the first part of the spatial light modulator and the second part of the spatial light modulator. The first optical output may include a first wavelength band and the second optical output may include a second wavelength band that may be different than the first wavelength band. The second optical output may include a second wavelength band of red light, a second wavelength band of green light, and a second wavelength band of blue light. The second wavelength band of red light may be different than the first wavelength band of red light. The second wavelength band of green light may be different than the first wavelength band of green light. The second wavelength band of blue light may be different than the first wavelength band of blue light. The first wavelength band may be visible light and the second wavelength band may be infrared light. The processing of the spatial light modulator may spatially form the first optical output. The spatial light modulator may include a reflective liquid-crystal light valve, a liquid-crystal-on-silicon light valve, a digital-micromirror-device light valve, or a transmissive liquid-crystal light valve. There may also be a mixing rod, and the first optical output may enter the mixing rod. The first optical output may have a first polarization state and the second optical output may have a second polarization state, and the first polarization state may be different than the second polarization state. The first polarization state may be orthogonal to the second polarization state.

In general, in one aspect, a stereoscopic display system that includes two laser light sources, two mixing rods, three spatial light modulators, and two beam combiners. The first laser light source illuminates the first mixing rod. The second laser light source illuminates the second mixing rod. The first and second mixing rods illuminate the first beam combiner. The first beam combiner illuminates the first spatial light modulator, the second spatial light modulator, and the third spatial light modulator. The first spatial light modulator, the second spatial light modulator, and the third spatial light modulator illuminate the second beam combiner. A beam of light from the first laser light source is processed by a first part of the first spatial light modulator, a first part of the second spatial light modulator, and a first part of the third spatial light modulator. A beam of light from the second laser light source is processed by a second part of the first spatial light modulator, a second part of the second spatial light modulator, and a second part of the third spatial light modulator.

In general, in one aspect, a method of illumination that includes generating a first beam of light, generating a second beam of light, processing the first beam of light with a first part of a spatial light modulator to form a third beam of light, and processing the second beam of light with a second part of the spatial light modulator to form a fourth beam of light.

Implementations may include one or more of the following features. The third beam of light may be combined with the fourth beam of light. The first beam of light may have an etendue lower than 0.1 $mm^2$ sr. The first part of the spatial light modulator may be used to form an image for the left eye and the second part of the spatial light modulator may be used to form an image for the right eye.

DETAILED DESCRIPTION

Split image projection has the advantage of using fewer SLMs and other optical components compared to simultaneous projection. Split image projection also has the advantage of not requiring active glasses such as those used in time sequential projection. Technological progress leads towards ever higher and higher pixel counts per SLM which also tends to favor using more than one image per SLM while still allowing sufficient pixels in each image to achieve high resolutions such as 1920×1080 pixels (full high definition) which is also known as 2K. Very high resolution 4K SLMs, (which may be 4096×2160 resolution) are available for cinema applications. Two 2K images may be processed on two parts of one 4K SLM. In the case of stereoscopic projection, one of the 2K images may be viewed by the left eye, and the other 2K image may be viewed by the right eye. Dual illumination allows one low-etendue light source to illuminate one part of the SLM, and a second low-etendue light source to illuminate a second part of the same SLM. Other advantages of low-etendue light sources will also be seen in the following examples.

Figure 1:
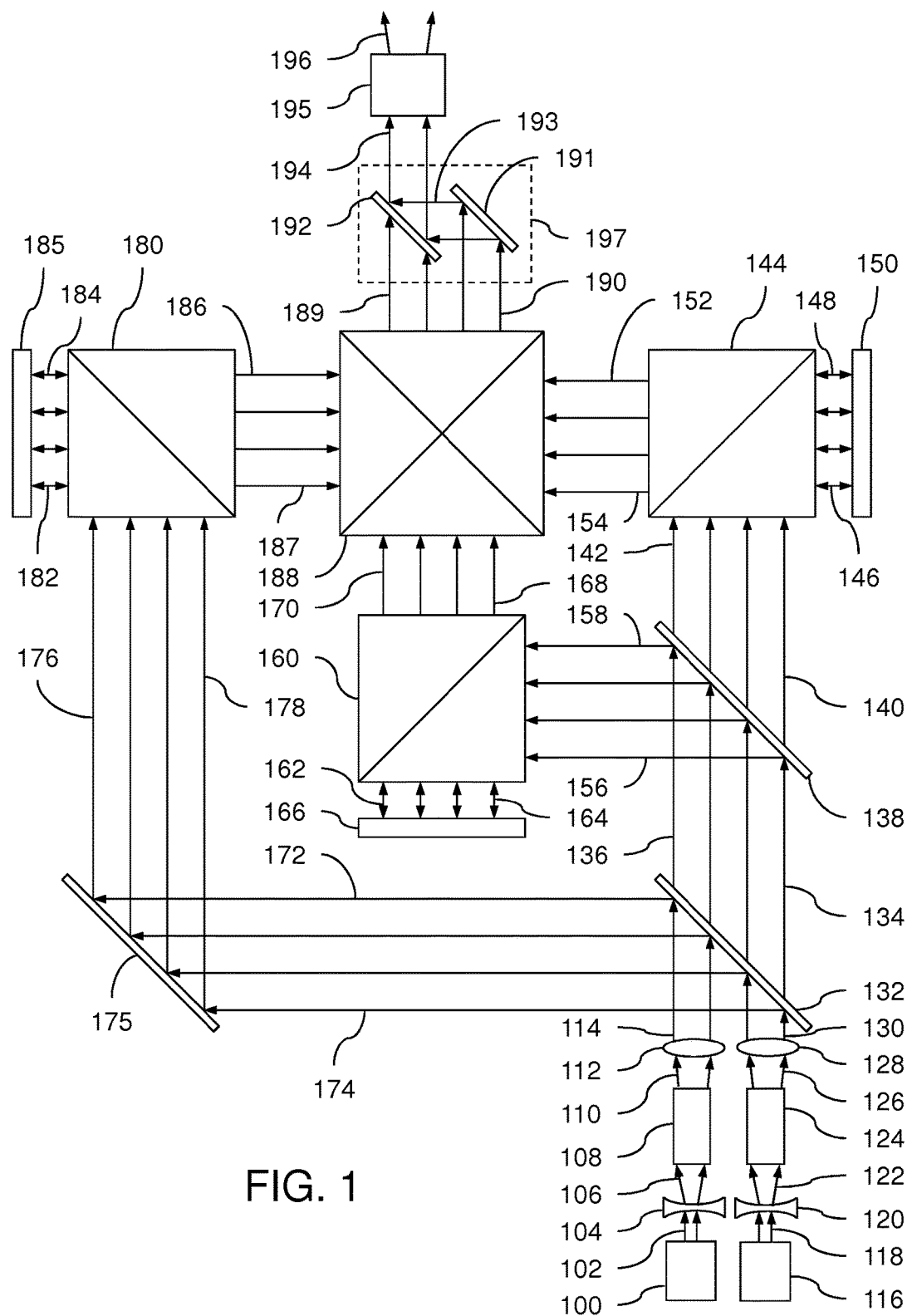
FIG. 1 is a top view of a projector optical design with dual illumination using LCOS SLMs.

FIG. 1 shows a projector optical design with dual illumination using LCOS SLMs. First light source 100 produces first beam segment 102 which is spread by first lens system 104 to make second beam segment 106. Second beam segment 106 is homogenized by first mixing rod 108 to produce third beam segment 110. Third beam segment 110 is collimated by second lens system 112 to form fourth beam segment 114. Fourth beam segment 114 partially reflects from first dichroic beamsplitter (DBS) 132 to form fifth beam segment 172 and partially transmits to form sixth beam segment 136. Fifth beam segment 172 reflects from first minor 175 to form seventh beam segment 176. Seventh beam segment 176 enters first polarizing beamsplitter (PBS) 180 and is reflected to form eighth beam segment 184. Eighth beam segment 184 is processed by first SLM 185 which rotates the polarization of each pixel depending on the desired brightness of the pixel and reflects eighth beam segment 184 back along its input path to reenter first PBS 180. On a pixel-by-pixel basis, if the polarization is not changed relative to the input beam, the light reflects inside first PBS 180 to go back towards first light source 100. If the polarization has been changed relative to the input beam, some or all of the light (depending on how much the polarization has been changed) passes through first PBS 180 to form ninth beam segment 186.

Sixth beam segment 136 partially reflects from second DBS 138 to form tenth beam segment 158 and partially transmits to form eleventh beam segment 142. Tenth beam segment 158 enters second PBS 160 and is reflected to form twelfth beam segment 164. Twelfth beam segment 164 is processed by second SLM 166 which rotates the polarization of each pixel depending on the desired brightness of the pixel and reflects twelfth beam segment 164 back along its input path to reenter second PBS 160. On a pixel-by-pixel basis, if the polarization is not changed relative to the input beam, the light reflects inside second PBS 160 to go back towards first light source 100. If the polarization has been changed relative to the input beam, some or all of the light (depending on how much the polarization has been changed) passes through second PBS 160 to form thirteenth beam segment 168.

Eleventh beam segment 142 enters third PBS 144 and is reflected to form fourteenth beam segment 146. Fourteenth beam segment 146 is processed by third SLM 150 which rotates the polarization of each pixel depending on the desired brightness of the pixel and reflects fourteenth beam segment 146 back along its input path to reenter third PBS 144. On a pixel-by-pixel basis, if the polarization is not changed relative to the input beam, the light reflects inside third PBS 144 to go back towards first light source 100. If the polarization has been changed relative to the input beam, some or all of the light (depending on how much the polarization has been changed) passes through third PBS 144 to form fifteenth beam segment 154.

First beam combiner 188 combines ninth beam segment 186, thirteenth beam segment 168, and fifteenth beam segment 154 to form sixteenth beam segment 190. Sixteenth beam segment 190 reflects from second mirror 191 to form seventeenth beam segment 193. Seventeenth beam segment 193 reflects from third DBS 192 to form beam segment 194.

Second light source 116 produces eighteenth beam segment 118 which is spread by third lens system 120 to make nineteenth beam segment 122. Nineteenth beam segment 122 is homogenized by second mixing rod 124 to produce twentieth beam segment 126. Twentieth beam segment 126 is collimated by fourth lens system 128 to form twenty-first beam segment 130. Twenty-first beam segment 130 partially reflects from first DBS 132 to form twenty-second beam segment 174 and partially transmits to form twenty-third beam segment 134. Twenty-second beam segment 174 reflects from first minor 175 to form twenty-fourth beam segment 178. Twenty-fourth beam segment 178 enters first polarizing beamsplitter (PBS) 180 and is reflected to form twenty-fifth beam segment 182. Twenty-fifth beam segment 182 is processed by first SLM 185, which rotates the polarization of each pixel depending on the desired brightness of the pixel and reflects twenty-fifth beam segment 182 back along its input path to reenter first PBS 180. On a pixel-by-pixel basis, if the polarization is not changed relative to the input beam, the light reflects inside first PBS 180 to go back towards first light source 100. If the polarization has been changed relative to the input beam, some or all of the light (depending on how much the polarization has been changed) passes through first PBS 180 to form twenty-sixth beam segment 187.

Twenty-third beam segment 134 partially reflects from second DBS 138 to form twenty-seventh beam segment 156 and partially transmits to form twenty-eighth beam segment 140. Twenty-seventh segment 156 enters second PBS 160 and is reflected to form twenty-ninth beam segment 162. Twenty-ninth beam segment 162 is processed by second SLM 166, which rotates the polarization of each pixel depending on the desired brightness of the pixel and reflects twenty-ninth beam segment 162 back along its input path to reenter second PBS 160. On a pixel-by-pixel basis, if the polarization is not changed relative to the input beam, the light reflects inside second PBS 160 to go back towards first light source 100. If the polarization has been changed relative to the input beam, some or all of the light (depending on how much the polarization has been changed) passes through second PBS 160 to form thirtieth beam segment 170.

Twenty-eighth beam segment 140 enters third PBS 144 and is reflected to form thirty-first beam segment 148. Thirty-first beam segment 148 is processed by third SLM 150, which rotates the polarization of each pixel depending on the desired brightness of the pixel and reflects thirty-first beam segment 148 back along its input path to reenter third PBS 144. On a pixel-by-pixel basis, if the polarization is not changed relative to the input beam, the light reflects inside third PBS 144 to go back towards first light source 100. If the polarization has been changed relative to the input beam, some or all of the light (depending on how much the polarization has been changed) passes through third PBS 144 to form thirty-second beam segment 152.

First beam combiner 188 combines twenty-sixth beam segment 187, thirtieth beam segment 170, and thirty-second beam segment 152 to form thirty-third beam segment 189. Thirty-third beam segment 189 passes through third DBS 192 to combine with seventeenth beam segment 193 in forming thirty-fourth beam segment 194. Thirty-fourth beam segment 194 passes through fifth lens system 195 to form thirty-fifth beam segment 196 which passes outside of the projector to make a viewable image on a projection screen (not shown).

First beam combiner 188 may be an X-prism. Second mirror 191 and third DBS 192 form second beam combiner 197. First lens system 104, second lens system 112, third lens system 120, fourth lens system 128, and fifth lens system 195 may be formed from a single lens or any number of lenses that guide the light beams into the desired positions. The sizes of components and distances between components are not shown to scale in FIG. 1. Some optical components may be positioned against other optical components so that there is no gap between the components. Auxiliary optical components such as polarizers, relay lenses, skew ray plates, polarization rotation plates, and trim filters are not shown in FIG. 1. The three SLMs shown in FIG. 1 may be each assigned to a primary color so that one is red, one is green, and one is blue. First light source 100 may output sub-bands red 1, green 1, and blue 1 whereas second light source 116 may output sub-bands red 2, green 2, and blue 2. First DBS 132 may reflect blue while passing green and red. Second DBS 138 may reflect green while passing red. Third DBS 192 may reflect sub-bands red 1, green 1, and blue 1 while passing sub-bands red 2, green 2, and blue 2. First light source 100 and second light source 116 may output polarized light.

Figure 2:
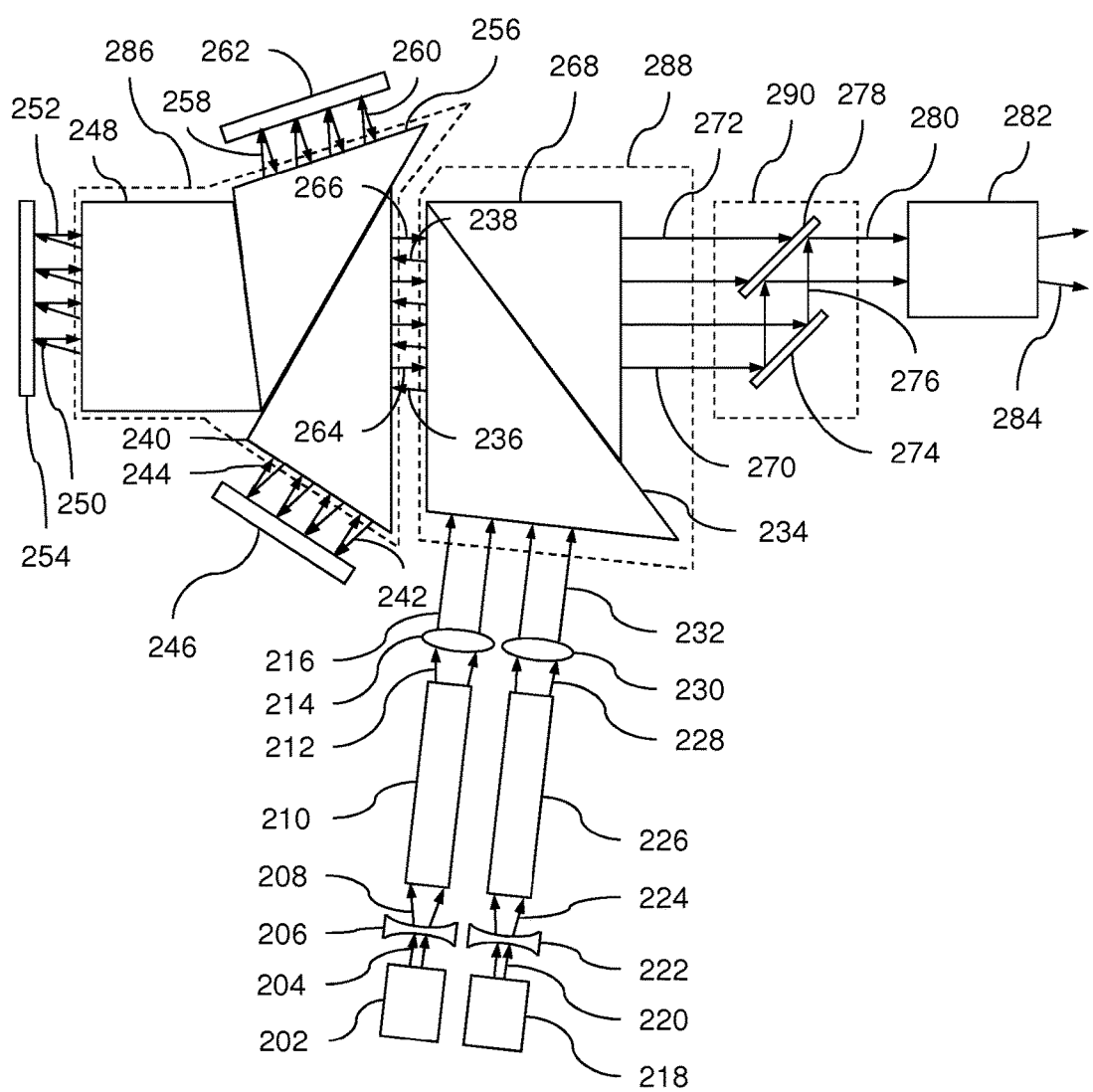
FIG. 2 is a top view of a projector optical design with dual illumination using DMD SLMs.

FIG. 2 shows a projector optical design with dual illumination using DMD SLMs. First light source 202 produces first beam segment 204 which is spread by first lens system 206 to make second beam segment 208. Second beam segment 208 is homogenized by first mixing rod 210 to produce third beam segment 212. Third beam segment 212 is collimated by second lens system 214 to form fourth beam segment 216. Fourth beam segment 216 enters first subprism 234 and reflects from the interface of first subprism 234 and second subprism 268 to form fifth beam segment 238. Fifth beam segment 238 partially reflects from the interface between third subprism 240 and fourth subprism 256 and then from the entrance face of third subprism 240 to form sixth beam segment 244. Fifth beam segment 238 also partially transmits from the interface between third subprism 240 and fourth subprism 256 and partially transmits from the interface between fourth subprism 256 and fifth subprism 248 to form seventh beam segment 252. Fifth beam segment 238 also partially reflects from the interface between fourth subprism 256 and fifth subprism 248 and then reflects from the interface between fourth subprism 256 and third subprism 240 to form eighth beam segment 260. Sixth beam segment 244 is processed by first SLM 246 which flips micromirrors for each pixel depending on the desired brightness of the pixel. For darker pixels, more light is directed back through the prism systems until the light is absorbed in a beam dump (not shown) and for brighter pixels, more light is directed to the output path which reflects from the entrance face of third subprism 240 and then from the interface between third subprism 240 and fourth subprism 256 to form ninth beam segment 266.

Seventh beam segment 252 is processed by second SLM 254 which flips micromirrors for each pixel depending on the desired brightness of the pixel. For darker pixels, more light is directed back through the prism systems until the light is absorbed in a beam dump (not shown) and for brighter pixels, more light is directed to the output path which passes through the interface between fifth subprism 248 and fourth subprism 256, then passes through the interface between fourth subprism 256 and third subprism 240 to join sixth beam segment 244 in forming ninth beam segment 266.

Eighth beam segment 260 is processed by third SLM 262 which flips micromirrors for each pixel depending on the desired brightness of the pixel. For darker pixels, more light is directed back through the prism systems until the light is absorbed in a beam dump (not shown) and for brighter pixels, more light is directed to the output path which reflects from the interface between fourth subprism 256 and third subprism 240, then reflects from the interface between fourth subprism 256 and fifth subprism 248, then passes through the interface between fourth subprism 256 and third subprism 240 to join sixth beam segment 244 and seventh beam segment 252 in forming ninth beam segment 266.

Ninth beam segment 266 passes through first subprism 234 and second subprism 268 to form tenth beam segment 272. Tenth beam segment 272 passes through first DBS 278 to form eleventh beam segment 280.

Second light source 218 produces twelfth beam segment 220 which is spread by third lens system 222 to make thirteenth beam segment 224. Thirteenth beam segment 224 is homogenized by second mixing rod 226 to produce fourteenth beam segment 228. Fourteenth beam segment 228 is collimated by fourth lens system 230 to form fifteenth beam segment 232. Fifteenth beam segment 232 enters first subprism 234 and reflects from the interface of first subprism 234 and second subprism 268 to form sixteenth beam segment 236. Sixteenth beam segment 236 partially reflects from the interface between third subprism 240 and fourth subprism 256 and then from the entrance face of third subprism 240 to form seventeenth beam segment 242. Sixteenth beam segment 236 also partially transmits from the interface between third subprism 240 and fourth subprism 256 and partially transmits from the interface between fourth subprism 256 and fifth subprism 248 to form eighteenth beam segment 250. Sixteenth beam segment 236 also partially reflects from the interface between fourth subprism 256 and fifth subprism 248 and then reflects from the interface between fourth subprism 256 and third subprism 240 to form nineteenth beam segment 258. Seventeenth beam segment 242 is processed by first SLM 246 which flips micromirrors for each pixel depending on the desired brightness of the pixel. For darker pixels, more light is directed back through the prism systems until the light is absorbed in a beam dump (not shown) and for brighter pixels, more light is directed to the output path which reflects from the entrance face of third subprism 240 and then from the interface between third subprism 240 and fourth subprism 256 to form twentieth beam segment 264.

Eighteenth beam segment 250 is processed by second SLM 254 which flips micromirrors for each pixel depending on the desired brightness of the pixel. For darker pixels, more light is directed back through the prism systems until the light is absorbed in a beam dump (not shown) and for brighter pixels, more light is directed to the output path which passes through the interface between fifth subprism 248 and fourth subprism 256, then passes through the interface between fourth subprism 256 and third subprism 240 to join seventeenth beam segment 242 in forming twentieth beam segment 264.

Nineteenth beam segment 258 is processed by third SLM 262 which flips micromirrors for each pixel depending on the desired brightness of the pixel. For darker pixels, more light is directed back through the prism systems until the light is absorbed in a beam dump (not shown) and for brighter pixels, more light is directed to the output path which reflects from the interface between fourth subprism 256 and third subprism 240, then reflects from the interface between fourth subprism 256 and fifth subprism 248, then passes through the interface between fourth subprism 256 and third subprism 240 to join seventeenth beam segment 242 and eighteenth beam segment 250 in forming twentieth beam segment 264.

Twentieth beam segment 264 passes through first subprism 234 and second subprism 268 to form twenty-first beam segment 270. Twenty-first beam segment 270 reflects from first mirror 274 to form twenty-second beam segment 276 and then reflects from first DBS 278 to join tenth beam segment 272 in forming eleventh beam segment 280. Eleventh beam segment 280 passes through fifth lens system 282 to form twenty-third beam segment 284 which passes outside of the projector to make a viewable image on a projection screen (not shown).

First subprism 234 and second subprism 268 form total internal reflection (TIR) prism 288. Third subprism 240, fourth subprism 256, and fifth subprism 248 form Philips prism 286. Minor 274 and DBS 278 form beam combiner 290. First lens system 206, second lens system 214, third lens system 222, fourth lens system 230, and fifth lens system 282 may be formed from a single lens or any number of lenses that guide the light beams into the desired positions. The sizes of components and distances between components are not shown to scale in FIG. 2. Some optical components may be positioned against other optical components so that there is no gap between the components. Auxiliary optical components such as polarizers, relay lenses, skew ray plates, polarization rotation plates, and trim filters are not shown in FIG. 2. The three SLMs shown in FIG. 2 may be each assigned to a primary color so that one is red, one is green, and one is blue. First light source 202 may output sub-bands red 1, green 1, and blue 1 whereas second light source 218 may output sub-bands red 2, green 2, and blue 2. The interface between third subprism 240 and fourth subprism 256 may reflect blue while passing green and red. The interface between fourth subprism 256 and fifth subprism 248 may transmit green while reflecting red. First DBS 278 may transmit sub-bands red 1, green 1, and blue 1 while reflecting sub-bands red 2, green 2, and blue 2.

Figure 3:
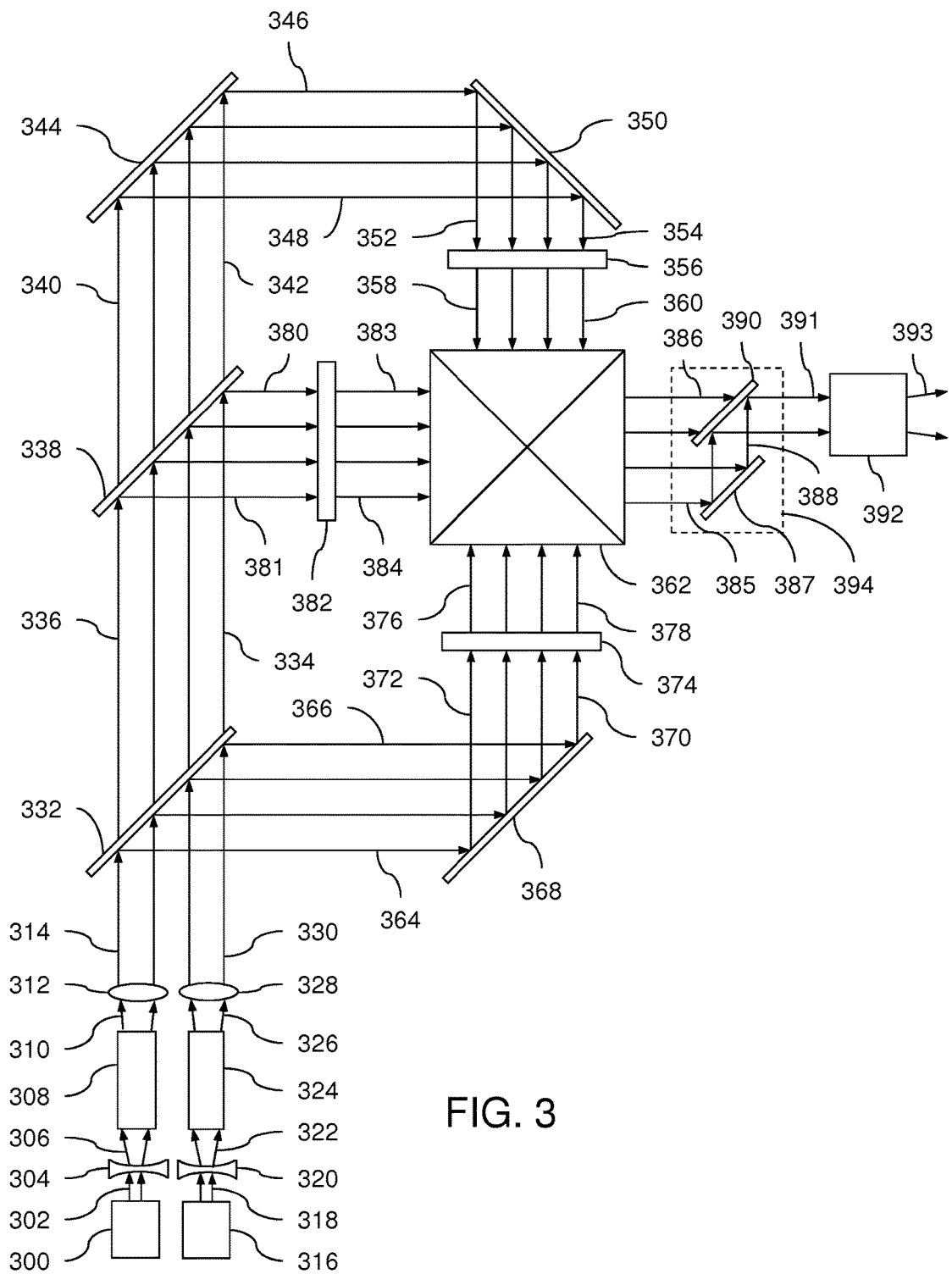
FIG. 3 is a top view of a projector optical design with dual illumination using transmissive LCD SLMs.

FIG. 3 shows a projector optical design with dual illumination using transmissive LCD SLMs. First light source 300 produces first beam segment 302 which is spread by first lens system 304 to make second beam segment 306. Second beam segment 306 is homogenized by first mixing rod 308 to produce third beam segment 310. Third beam segment 310 is collimated by second lens system 312 to form fourth beam segment 314. Fourth beam segment 314 partially reflects from first DBS 332 to form fifth beam segment 364 and partially transmits to form sixth beam segment 336. Fifth beam segment 364 reflects from first mirror 368 to form seventh beam segment 372. Seventh beam segment 372 is processed by first SLM 374 which rotates the polarization of each pixel depending on the desired brightness of the pixel. On a pixel-by-pixel basis, depending on the amount of polarization rotation, the light is transmitted or absorbed to a varying degree by a polarizer (not shown) to form eighth beam segment 376.

Sixth beam segment 336 partially reflects from second DBS 338 to form ninth beam segment 381 and partially transmits to form tenth beam segment 340. Ninth beam segment 381 is processed by second SLM 382 which rotates the polarization of each pixel depending on the desired brightness of the pixel. On a pixel-by-pixel basis, depending on the amount of polarization rotation, the light is transmitted or absorbed to a varying degree by a polarizer (not shown) to form eleventh beam segment 384.

Tenth beam segment 340 reflects from second minor 344 to form twelfth beam segment 348. Twelfth beam segment 348 reflects from third mirror 350 to form thirteenth beam segment 354. Thirteenth beam segment 354 is processed by third SLM 356 which rotates the polarization of each pixel depending on the desired brightness of the pixel. On a pixel-by-pixel basis, depending on the amount of polarization rotation, the light is transmitted or absorbed to a varying degree by a polarizer (not shown) to form fourteenth beam segment 360.

First beam combiner 362 combines eighth beam segment 376, eleventh beam segment 384, and fourteenth beam segment 360 to form fifteenth beam segment 385. Fifteenth beam segment 385 reflects from fourth minor 387 to form sixteenth beam segment 388. Sixteenth beam segment 388 reflects from third DBS 390 to form seventeenth beam segment 391.

Second light source 316 produces eighteenth beam segment 318 which is spread by third lens system 320 to make nineteenth beam segment 322. Nineteenth beam segment 322 is homogenized by second mixing rod 324 to produce twentieth beam segment 326. Twentieth beam segment 326 is collimated by fourth lens system 328 to form twenty-first beam segment 330. Twenty-first beam segment 330 partially reflects from first DBS 332 to form twenty-second beam segment 366 and partially transmits to form twenty-third beam segment 334. Twenty-second beam segment 366 reflects from first minor 368 to form twenty-fourth beam segment 370. Twenty-fourth beam segment 370 is processed by first SLM 374 which rotates the polarization of each pixel depending on the desired brightness of the pixel. On a pixel-by-pixel basis, depending on the amount of polarization rotation, the light is transmitted or absorbed to a varying degree by a polarizer (not shown) to form twenty-fifth beam segment 378.

Twenty-third beam segment 334 partially reflects from second DBS 338 to form twenty-sixth beam segment 380 and partially transmits to form twenty-seventh beam segment 342. Twenty-sixth beam segment 380 is processed by second SLM 382 which rotates the polarization of each pixel depending on the desired brightness of the pixel. On a pixel-by-pixel basis, depending on the amount of polarization rotation, the light is transmitted or absorbed to a varying degree by a polarizer (not shown) to form twenty-eighth beam segment 383.

Twenty-seventh beam segment 342 reflects from second minor 344 to form twenty-ninth beam segment 346. Twenty-ninth beam segment 346 reflects from third minor 350 to form thirtieth beam segment 352. Thirtieth beam segment 352 is processed by third SLM 356 which rotates the polarization of each pixel depending on the desired brightness of the pixel. On a pixel-by-pixel basis, depending on the amount of polarization rotation, the light is transmitted or absorbed to a varying degree by a polarizer (not shown) to form thirty-first beam segment 358.

First beam combiner 362 combines twenty-fifth beam segment 378, twenty-eighth beam segment 383, and thirty-first beam segment 358 to form thirty-second beam segment 386. Thirty-second beam segment 386 passes through third DBS 390 to combine with sixteenth beam segment 388 in forming seventeenth beam segment 391. Seventeenth beam segment 391 passes through fifth lens system 392 to form thirty-third beam segment 393 which passes outside of the projector to make a viewable image on a projection screen (not shown).

First beam combiner 362 may be an X-prism. Second minor 387 and third DBS 390 form second beam combiner 394. First lens system 304, second lens system 312, third lens system 320, fourth lens system 328, and fifth lens system 392 may be formed from a single lens or any number of lenses that guide the light beams into the desired positions. The sizes of components and distances between components are not shown to scale in FIG. 3. Some optical components may be positioned against other optical components so that there is no gap between the components. Auxiliary optical components such as polarizers, relay lenses, skew ray plates, polarization rotation plates, and trim filters are not shown in FIG. 3. The three SLMs shown in FIG. 3 may be each assigned to a primary color so that one is red, one is green, and one is blue. First light source 300 may output sub-bands red 1, green 1, and blue 1 whereas second light source 316 may output sub-bands red 2, green 2, and blue 2. First DBS 332 may reflect blue while passing green and red. Second DBS 338 may reflect green while passing red. Third DBS 390 may reflect sub-bands red 1, green 1, and blue 1 while passing sub-bands red 2, green 2, and blue 2. First light source 300 and second light source 316 may output polarized light.

Figure 4:
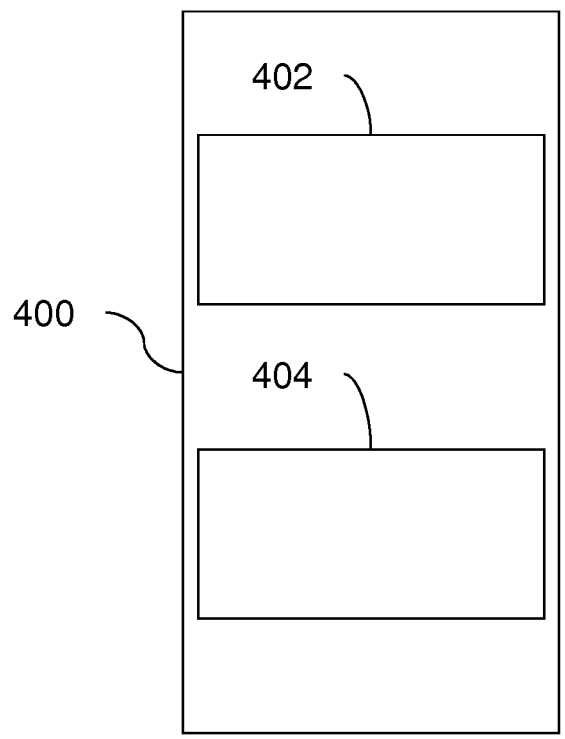
FIG. 4 is a front view of a portrait-oriented SLM with two images located one above the other.

FIG. 4 shows a portrait-oriented SLM with two images located one above the other. First image 402 is formed in one part of SLM 400 and second image 404 is formed in another, distinct part of SLM 400. First image 402 and second image 404 are located such that most of the un-used pixels are above and below each image. In the case of stereoscopic systems, first image 402 may be the left eye image and second image 404 may be the right eye image.

Figure 5:
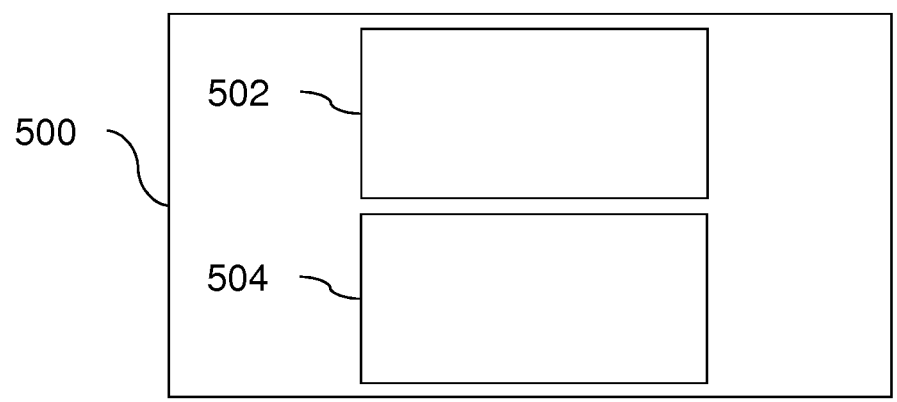
FIG. 5 is a front view of a landscape-oriented SLM with two images located one above the other.

FIG. 5 shows a landscape-oriented SLM with two images located one above the other. First image 502 is formed in one part of SLM 500 and second image 504 is formed in another, distinct part of SLM 500. First image 502 and second image 504 are located such that most of the un-used pixels are on the left and right of each image. In the case of stereoscopic systems, first image 502 may be the left eye image and second image 504 may be the right eye image.

Figure 6:
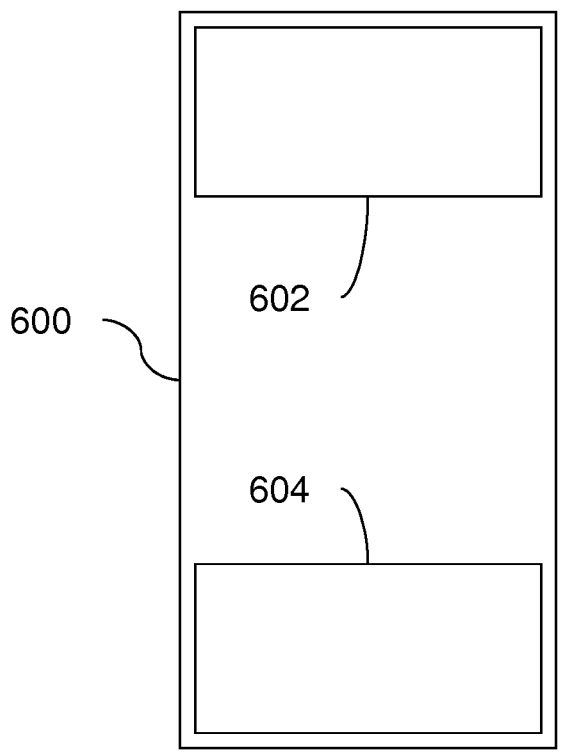
FIG. 6 is a front view of a portrait-oriented SLM with two images far apart and located one above the other.

FIG. 6 shows a portrait-oriented SLM with two images far apart and located one above the other. First image 602 is formed in one part of SLM 600 and second image 604 is formed in another, distinct part of SLM 600. First image 602 and second image 604 are located such that most of the un-used pixels are between the two images. In the case of stereoscopic systems, first image 602 may be the left eye image and second image 604 may be the right eye image. By placing first image 602 far from second image 604 an increased guard band is formed between the two images that may reduce the amount of cross-talk or light spillage between the two images.

Figure 7:
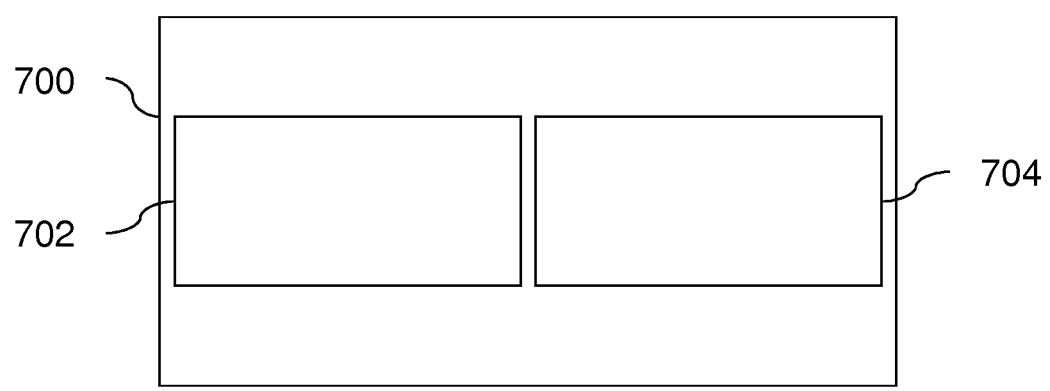
FIG. 7 is a front view of a landscape-oriented SLM with two images located on the left and right of each other.

FIG. 7 shows a landscape-oriented SLM with two images located on the left and right of each other so that they form a central band across the horizontal center of the SLM. First image 702 is formed in one part of SLM 700 and second image 704 is formed in another, distinct part of SLM 700. First image 702 and second image 704 are located such that most of the un-used pixels are formed into one band above the images and one band below the images. In the case of stereoscopic systems, first image 702 may be the left eye image and second image 704 may be the right eye image.

Figure 8:
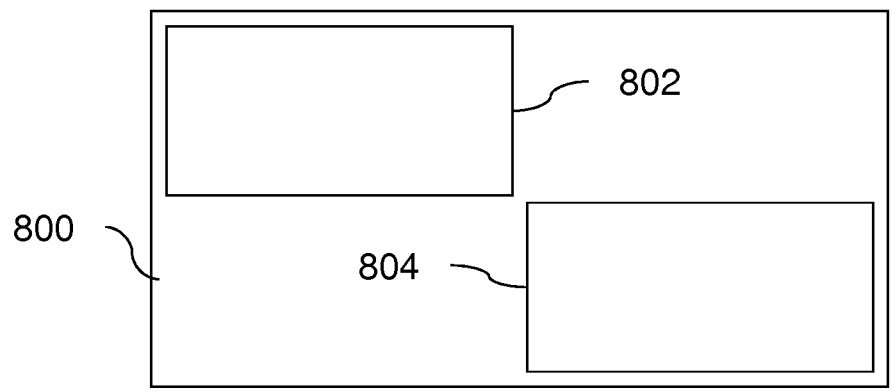
FIG. 8 is a front view of a landscape-oriented SLM with two images located one diagonal to the other.

FIG. 8 shows a landscape-oriented SLM with two images located one diagonal to the other. First image 802 is formed in one part of SLM 800 and second image 804 is formed in another, distinct part of SLM 800. First image 802 and second image 804 are located such that most of the un-used pixels are above and below the two images in diagonally opposite corners. In the case of stereoscopic systems, first image 802 may be the left eye image and second image 804 may be the right eye image.

Figure 9:
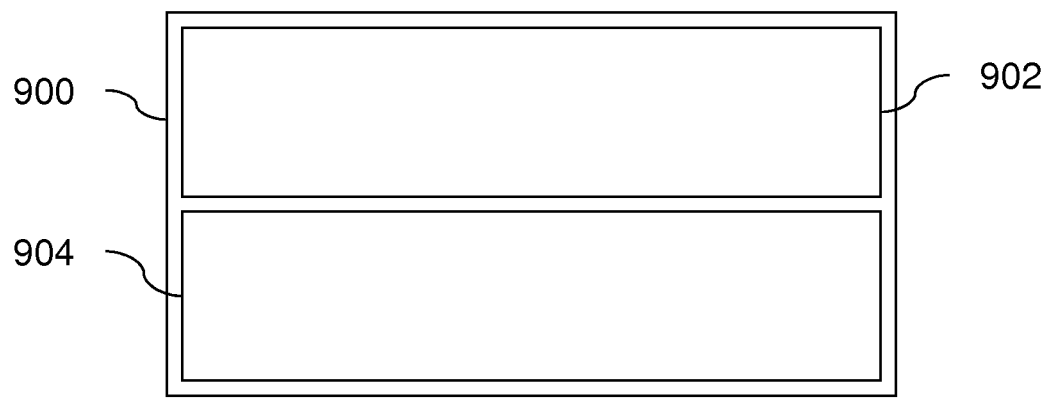
FIG. 9 is a front view of a landscape-oriented SLM with an anamorphic pattern of pixels.

FIG. 9 shows a landscape-oriented SLM with an anamorphic pattern of pixels with one image located above the other. First image 902 is formed in one part of SLM 900 and second image 904 is formed in another, distinct part of SLM 900. First image 902 and second image 904 use substantially all of the pixels in SLM 900. An anamorphic lens may be used to compress the horizontal axis (relative to the vertical axis) or expand the vertical axis (relative to the horizontal axis) such that the final viewable images are formed with the desired aspect ratio. In the case of stereoscopic systems, first image 902 may be the left eye image and second image 904 may be the right eye image.

Figure 10:
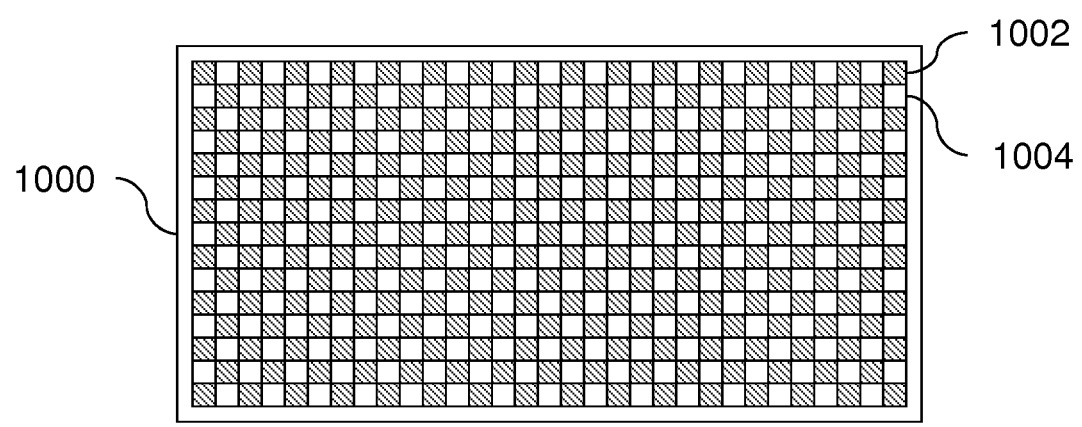
FIG. 10 is a front view of a landscape-oriented SLM with a checkerboard pattern of pixels.

FIG. 10 shows a landscape-oriented SLM with a checkerboard pattern of pixels. Pixels of the first image on SLM 1000 are shown cross-hatched such as pixel 1002 and pixels of the second image on SLM 1000 are shown not cross-hatched such as pixel 1004. A 31×15 array of pixels is shown for clarity, but SLMs typically have many more pixels to form high resolution images. The checkerboard pattern uses substantially all the pixels of the SLM. In the case of stereoscopic systems, the first image may be the left eye image and second image may be the right eye image.

Figure 11:
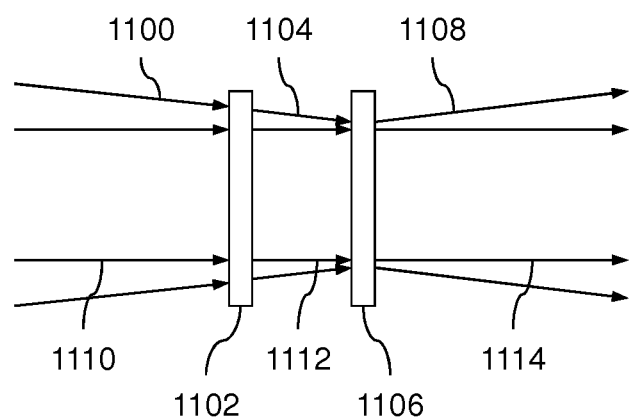
FIG. 11 is a top view of low etendue illumination compared to high etendue illumination.

FIG. 11 shows low etendue illumination of an SLM and an optical component compared to high etendue illumination of the same SLM and optical component. First beam segment 1100 passes through optical component 1102 to form second beam segment 1104. Second beam segment 1104 passes through SLM 1106 to form third beam segment 1108. Alternatively, fourth beam segment 1110 passes through optical component 1102 to form fifth beam segment 1112. Fifth beam segment 1112 passes through SLM 1106 to form sixth beam segment 1114. First beam segment 1100, second beam segment 1104, and third beam segment 1108 have high etendue. Fourth beam segment 1110, fifth beam segment 1112, and sixth beam segment 1114 have low etendue. First beam segment 1100, second beam segment 1104, and third beam segment 1108 can be seen to have higher angles of incidence for rays near the edges of the beam segments. Fourth beam segment 1110, fifth beam segment 1112, and sixth beam segment 1114 can be seen to have lower angles of incidence for rays near the edges of the beam segments. Optical component 1102 may be any component that processes light such as a polarizer, skew ray plate, polarization rotation plate, interference filter, beamsplitter, mirror, or lens assembly. Skew ray plates are used to compensate the polarization state of rays at high angle of incidence. Polarization rotation plates make a controlled change in polarization such as changing linear polarization to circular polarization. SLM 1106 may be any sort of SLM such as DMD, LCD, or LCOS. Optical component 1102 and SLM 1106 are shown operating in transmission, but may alternatively operate in reflection. Optical component 1102 is shown to in the light path before SLM 1106, but alternatively, optical component 1102 may be after SLM 1106. The included angles of beam segments shown in FIG. 11 are for illustrative purposes only. The actual beam angles may be larger or smaller depending on the design of the actual optical system.

Figure 12:
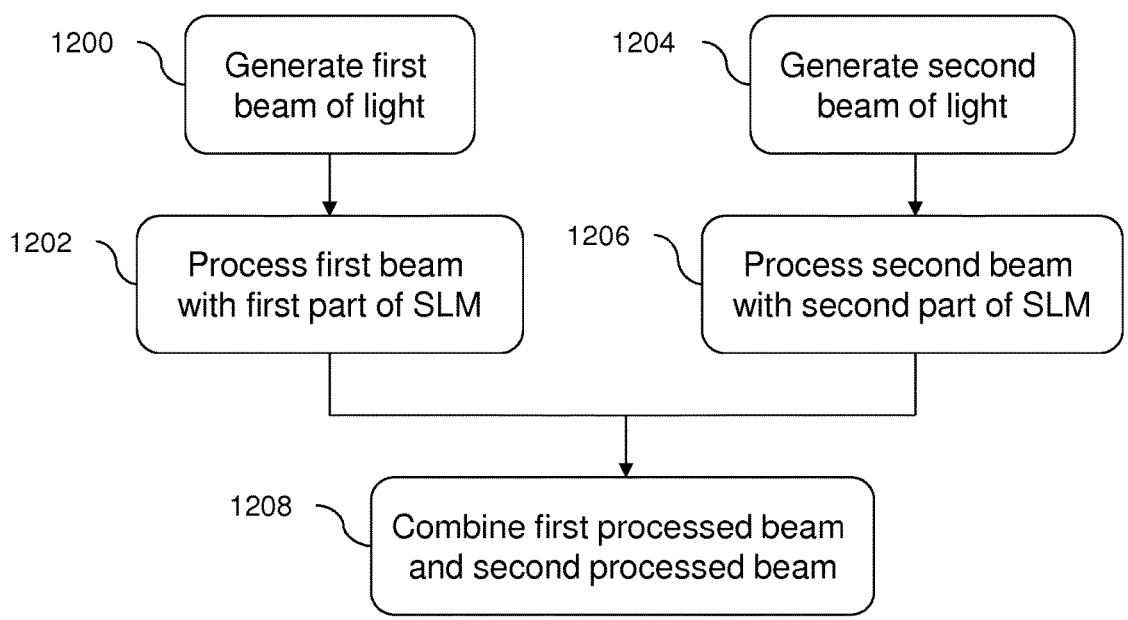
FIG. 12 is a flow chart of a method of dual illumination.

FIG. 12 shows a flow chart of a method of dual illumination. In this method, an SLM is illuminated by two light sources. In step 1200, a first beam of light is generated. In step 1202, the first beam of light is processed by the first part of an SLM. In step 1204, a second beam of light generated. In step 1206, the second beam of light is processed by the second part of the same SLM. In optional step 1208, the first beam of light after processing is combined with the second beam of light after processing.

When considering a light source, etendue is an optical property that characterizes how spread out the light beam is in both area and angle. In simple terms, the approximate etendue of a light source may be computed by multiplying the emitting area of the source by the solid angle that the light beam subtends. Lasers have low etendue whereas arc lamps, filament lamps, and LEDs have high etendue. If the light source has sufficiently low etendue, it is possible to focus light through a subsequent optical system with high efficiency. Laser light sources enable the independent illumination of more than one part of an SLM with high brightness. As an example, the beam from a semiconductor laser may have a cross-sectional area of 1 mm$^2$ and a beam divergence of 10 milliradians which makes an etendue of approximately 0.01 mm$^2$ sr. Most lasers have etendues less than 0.1 mm$^2$ sr, which allows effective illumination of multiple parts of an SLM. An example of a high etendue light source is an arc lamp which may have an emitting area of 3 mm$^2$ and a beam divergence of 12.6 radians which makes an etendue of approximately 38 mm$^2$ sr.

When considering an optical system which accepts light from a light source, etendue is the optical property that characterizes how much light the optical system can accept in both aperture area and angle. In simple terms, the approximate etendue of an optical system may be computed by multiplying the area of the entrance pupil by the solid angle of the light path as seen from the entrance pupil. For an optical system of a fixed etendue such as a projector SLM, associated lens systems, and auxiliary optical components, the etendue of the light source should be lower than or equal to the etendue of the optical system in order to efficiently illuminate the optical system without vignetting. Additional advantages may be gained by using an even lower source etendue. Low source etendue means that the angle of incidence is smaller, especially for rays that are near the edge of the beam. A low angle of incidence means that certain optical components may be simplified or may operate more effectively. For example, polarization uniformity may be improved in LCD and LCOS SLMs, skew ray plates may not be necessary, PBSs and polarization filters may have higher extinction ratios, multilayer interference filters may have less angle shift, and lens assemblies may be less subject to optical aberrations.

Laser light sources may include optical parametric oscillators (OPOs). The detailed operation of OPOs is described in U.S. Pat. No. 5,740,190, the complete disclosure of which is incorporated herein by reference. By suitably designing the OPO and controlling operation parameters such as temperature, when the input light is green, the outputs may be blue and red, thus making all three colors required for a full-color projection display. By mixing red, green, and blue light, other colors may be generated in the projector.

Prisms and beamsplitters are used in projectors and other optical systems to control the path of light beams. DBSs split or combine wavelength bands of light that form various colors and are usually constructed from interference coatings on flat substrates or prism surfaces. PBSs split or combine different polarizations of light and may be constructed from interference coatings, prisms, or by other techniques such as wire grids. Philips prisms consist of three subprisms with DBSs on two of the internal faces. TIR prisms have an air gap inside that makes total internal reflection when the incidence angle of the beam is greater than the critical angle. X-prisms consist of 4 subprisms assembled into a cube such that the internal surfaces have DBSs along both diagonal faces. Depending on their roles in the light path, prisms and beamsplitters may act as beam separators, beam combiners, or both at the same time.

SLMs may be one, two, or three-dimensional. In each case, an SLM processes an incoming beam of light to produce an outgoing beam of light which has pixels formed in a two-dimensional array. A one-dimensional SLM has a single pixel which is scanned in two directions to form a two-dimensional image. A one-dimensional SLM has pixels arranged in a one-dimensional line segment which is scanned in one direction to form a two-dimensional image. A two-dimensional SLM has pixels arranged in a two-dimensional shape such as a rectangle.

A mixing rod is used to make a light beam more spatially uniform and to form the beam into a specific cross-section, such as rectangular, so that the beams can better match the shape of an SLM. A mixing rod may be constructed from a solid rectangular parallelepiped where total internal reflection guides the rays of light inside to make multiple bounces within the mixing rod. In the case of dual illumination, there are two mixing rods, and a thin air gap may be used to keep the light within each rod while keeping the rods as close as possible. If the light sources are linearly polarized, orthogonal orientation of the mixing rods relative to the polarization state of the light will maintain the linear polarization state of the light sources. If circular polarization is desired at the output of the projectors, a quarter-wave rotation plate may be used to convert linear polarization to circular polarization. Alternatively, instead of mixing rods, other types of beam homogenizers may be used such as fly's eye lenses or diffusers.

Anamorphic lenses expand or compress one axis relative to the other, orthogonal axis. For example, an anamorphic lens may be used to compress the horizontal axis relative to the vertical axis, so that the 4:1 aspect ratios of the images in FIG. 9 become 2:1 aspect ratios. The use of an anamorphic lens allows substantially all of the pixels of SLM 900 to be used for imaging so that there are few or no un-used pixels. A small number of un-used pixels may surround the images as guard bands if necessary to allow for alignment tolerances.

Projection lens systems such as fifth lens system 195 in FIG. 1, fifth lens system 282 in FIG. 2, and fifth lens system 392 in FIG. 3 may consist of many individual lens elements that are combined into one lens system designed to project a large image onto a screen that is located many meters away from the projector. Functions such as image shifting, zooming, focusing, and other image control features may be built in the projection lens system. FIGS. 1 through 3 show a second beam combiner and one projection lens system, but alternatively, two projection lens systems may be used, one for each image. A second beam combiner is not necessary if two projection lens systems are used, but a beam separator may be required to increase the spacing between the two beams so that the beams can pass through the two projection lens systems.

Dual illumination of a projector is advantageous because light output may be increased relative to designs that use only one light source. This is particularly important for 3D projection systems that are often operated below desired brightness levels. Also, the light is efficiently used in a dual illumination system because the light is directed only to the pixels that form the images, and does not illuminate un-used pixels. In the configurations of FIGS. 9 and 10, a double benefit is that all the light is used and also all the pixels are used.

In one example of dual illumination, a wider gamut can be obtained by using more than three primary colors where the colors come from more than one light source. Red, green, and blue, may be generated by one light source whereas yellow (or yellow and cyan) may be generated by another light source. The two light sources may illuminate separate parts of an SLM or may overlap to illuminate the same part of the SLM.

In another example of dual illumination, an SLM may be illuminated with different wavelengths of the same primary color in order to reduce speckle. The checkerboard pattern of FIG. 10 may be illuminated such that the pixels that are cross-hatched process one wavelength of light, and the pixels that are not cross-hatched process another wavelength of light. The two wavelengths of light may be generated by two separate light sources, or may be generated by one light source with two output wavelengths. In the case where most of the speckle results from the green band, only the green band need be broken into two sub-bands to significantly reduce visible speckle.

Other optical systems include those with more than two light sources which may be utilized to illuminate two or more parts of each SLM, optical systems that are not imaging such as laser-beam spatial-shaping systems, optical systems that include non-visible light such as ultraviolet or infrared radiation, optical systems that use infrared radiation to simulate night-vision scenes, and optical systems that use inexpensive SLMs with resolution of 2K or less that are subdivided into more than one part.

Figure 13:
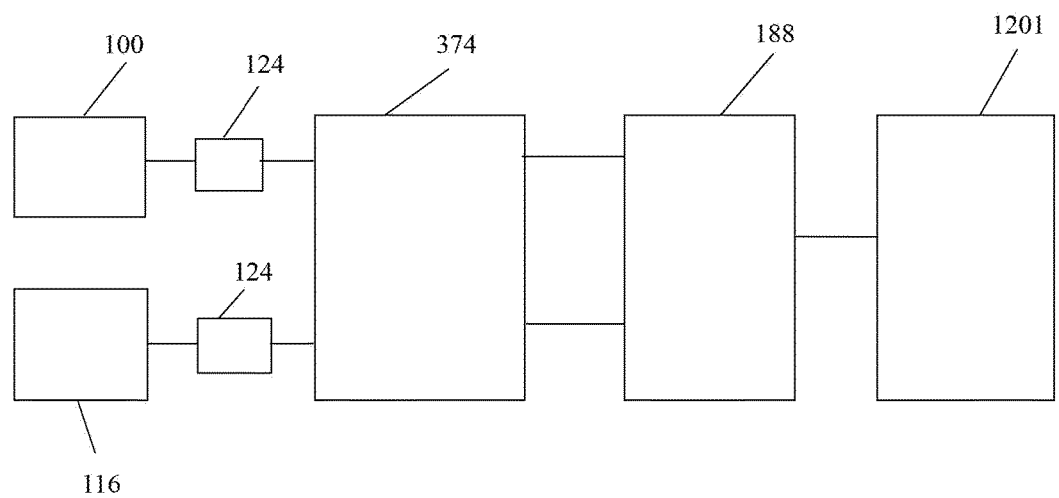
FIG. 13 is a block diagram of a projector optical design according to an exemplary and non-limiting embodiment.

With reference to FIG. 13, there is illustrated a block diagram of a projector optical design according to an exemplary and non-limiting embodiment showing a configuration including a first light source 100, a second light source 116, a mixing rod 124, a SLM 374, a beam combiner 188 and an amorphic lens 1201.

Other implementations are also within the scope of the following claims.

What is claimed is:

1. An optical system comprising:
a first light source;
a second light source; and
an optical system including a spatial light modulator;
wherein the first light source has a first optical output that travels a first path to be processed by a first part of the spatial light modulator and the second light source has a second optical output that travels a second path to be processed by a second part of the spatial light modulator,
wherein the first path is different than the second path,
wherein the optical system has a first etendue, and
wherein the first light source has a second etendue lower than 0.1 $mm^2$ sr, and lower than or equal to the first etendue.

2. The system of claim 1 wherein the first light source comprises a laser.

3. The system of claim 1 wherein the first part of the spatial light modulator is used to form an image for a left eye of a viewer and the second part of the spatial light modulator is used to form an image for a right eye of the viewer.

4. The system of claim 3 further comprising a beam combiner that forms a combined image by combining the image for the left eye with the image for the right eye.

5. The system of claim 4 wherein the combined image has a checkerboard pattern of pixels, wherein the checkerboard pattern alternates pixels for the left eye and pixels for the right eye.

6. The system of claim 3 further comprising an anamorphic lens that expands or compresses the image for the left eye of the viewer such that a single axis is expanded or compressed relative to an orthogonal axis.

7. The system of claim 3 wherein substantially all of the pixels of the spatial light modulator are utilized by the first part of the spatial light modulator and the second part of the spatial light modulator.

8. The system of claim 1 wherein the first optical output comprises a first wavelength band and the second optical output comprises a second wavelength band; the first wavelength band being distinct from the second wavelength band.

9. The system of claim 8 wherein the second optical output comprises a second wavelength band of red light, a second wavelength band of green light, and a second wavelength band of blue light; the second wavelength band of red light being distinct from the first wavelength band of red light; the second wavelength band of green light being distinct from the first wavelength band of green light; and the second wavelength band of blue light being distinct from the first wavelength band of blue light.

10. The system of claim 8 wherein the first wavelength band is visible light and the second wavelength band is infrared light.

11. The system of claim 1 wherein the processing of the spatial light modulator spatially forms the first optical output.

12. The system of claim 1 wherein the spatial light modulator comprises a reflective liquid-crystal light valve.

13. The system of claim 12 wherein the spatial light modulator comprises a liquid-crystal-on-silicon light valve.

14. The system of claim 1 wherein the spatial light modulator comprises a digital-micromirror-device light valve.

15. The system of claim 1 wherein the spatial light modulator comprises a transmissive liquid-crystal light valve.

16. The system of claim 1 further comprising a mixing rod, wherein the first optical output enters the mixing rod.

17. The system of claim 1 wherein the first optical output has a first polarization state and the second optical output has a second polarization state; the first polarization state being distinct from the second polarization state.

18. The system of claim 17 wherein the first polarization state is orthogonal to the second polarization state.

19. A stereoscopic display system comprising:
a first laser light source having a first etendue lower than 0.1 mm² sr;
a second laser light source;
an optical system having a second etendue greater than or equal to the first etendue, the optical system including:
a first mixing rod;
a second mixing rod;
a first spatial light modulator;
a second spatial light modulator;
a third spatial light modulator;
a first beam combiner; and
a second beam combiner;
wherein the first laser light source illuminates the first mixing rod; the second laser light source illuminates the second mixing rod;
the first and second mixing rods illuminate the first beam combiner; the first beam combiner illuminates the first spatial light modulator, the second spatial light modulator, and the third spatial light modulator; the first spatial light modulator, the second spatial light modulator, and the third spatial light modulator illuminate the second beam combiner; a beam of light from the first laser light source travels a first path to be processed by a first part of the first spatial light modulator, a first part of the second spatial light modulator, and a first part of the third spatial light modulator; and a beam of light from the second laser light source travels a second path to be processed by a second part of the first spatial light modulator, a second part of the second spatial light modulator, and a second part of the third spatial light modulator, and
wherein the first path is different than the second path.

20. A method of illumination comprising:
generating a first beam of light having a first etendue lower than 0.1 mm² sr;
generating a second beam of light;
after the first beam of light has traveled a first path, processing the first beam of light with a first part of a spatial light modulator to form a third beam of light; and
after the second beam of light has traveled a second path, processing the second beam of light with a second part of the spatial light modulator to form a fourth beam of light,
wherein the first path is different than the second path, and
wherein the spatial light modulator is part of an optical system, the optical system having a second etendue greater than or equal to the first etendue.

21. The method of claim 20 further comprising combining the third beam of light with the fourth beam of light.

22. The method of claim 20 wherein the first part of the spatial light modulator is used to form an image for a left eye of a viewer and the second part of the spatial light modulator is used to form an image for a right eye of the viewer.

* * * * *